United States Patent
Masumoto

(10) Patent No.: US 8,869,457 B2
(45) Date of Patent: Oct. 28, 2014

(54) ASSEMBLY STRUCTURE OF WEATHER STRIP

(71) Applicant: Nishikawa Rubber Co., Ltd., Hiroshima (JP)

(72) Inventor: Atsuo Masumoto, Hiroshima (JP)

(73) Assignee: Nishikawa Rubber Co., Ltd., Hiroshima-Shi, Hiroshima-Ken (JP)

( * ) Notice: Subject to any disclaimer, the term of this patent is extended or adjusted under 35 U.S.C. 154(b) by 0 days.

(21) Appl. No.: 14/018,702

(22) Filed: Sep. 5, 2013

(65) Prior Publication Data

US 2014/0075848 A1    Mar. 20, 2014

(30) Foreign Application Priority Data

Sep. 19, 2012   (JP) ................................. 2012-205825

(51) Int. Cl.
   *E06B 7/16*   (2006.01)
(52) U.S. Cl.
   USPC ............................. 49/495.1; 49/441; 49/498.1
(58) Field of Classification Search
   USPC ........ 49/475.1, 440, 441, 489.1, 495.1, 498.1
   See application file for complete search history.

(56) References Cited

U.S. PATENT DOCUMENTS

| | | | | |
|---|---|---|---|---|
| 5,010,689 A | * | 4/1991 | Vaughan | 49/440 |
| 5,072,545 A | * | 12/1991 | Nozaki | 49/490.1 |
| 6,723,414 B2 | * | 4/2004 | Aritake et al. | 428/122 |
| 7,487,615 B2 | * | 2/2009 | Watanabe et al. | 49/441 |
| 2002/0002796 A1 | * | 1/2002 | Hamada et al. | 49/441 |
| 2002/0046499 A1 | * | 4/2002 | Nozaki et al. | 49/441 |
| 2005/0204634 A1 | * | 9/2005 | Nozaki et al. | 49/441 |
| 2006/0026903 A1 | * | 2/2006 | Nozaki et al. | 49/441 |
| 2007/0251152 A1 | * | 11/2007 | Takase et al. | 49/441 |

FOREIGN PATENT DOCUMENTS

JP        03-15401 Y2    4/1991

* cited by examiner

*Primary Examiner* — Jerry Redman
(74) *Attorney, Agent, or Firm* — Robert P. Michal; Lucas & Mercanti LLP

(57) ABSTRACT

An outer-cabin side holding part and an inner-cabin side holding part are provided on uneven positions on a frame body installed on a door opening edge; an anchoring part is protrudingly provided on an inner-cabin side of an inner-cabin side pillar part; the outer-cabin side end and the anchoring part of an installation base member are anchored with the outer-cabin side holding part and the inner-cabin side holding part; and a total of a distance between the anchoring part and the base root of the inner-cabin side pillar part and a distance between the base root and an outer-cabin side end of the installation base member is longer than a straight-linear distance between the outer-cabin side holding part and the inner-cabin side holding part.

15 Claims, 4 Drawing Sheets

ASSEMBLY STRUCTURE OF WEATHER STRIP

CROSS REFERENCE TO RELATED APPLICATION

This application claims the benefit under 35 USC §119 of JP Patent Application JP 2012-205825 filed Sep. 19, 2012, the entire disclosure of which is incorporated herein by reference.

BACKGROUND INFORMATION

The present invention relates to assembly structure of weather strips installed along door opening edges of retractable roof vehicles including convertible vehicles or hard top vehicles, that make elastic contact with door glasses for sealing outside and inside of vehicles.

FIG. 5 is an external view of one type of retractable roof vehicles of which roofs that open and close are folded to open. The roof includes a soft top 1 which is folded and put away in a trunk 2 on a lower rear side of a vehicle. Another roof of the retractable roof vehicle includes a roof panel and a back window panel at the back of the roof panel instead of the soft top 1, which are folded and put away in the trunk 2 while the roof panel as folded is piled on the back window panel. Such vehicles are generally called retractable hard top, coupe cabriolet or coupe convertible.

In the retractable roof vehicle, as shown in FIG. 6, a front pillar 3 and the soft top 1 as an opening edge of a door 2 have a weather strip 20 fit in a retainer 10 installed on side edges thereof. The weather strip 20 makes elastic contact with a door glass (side glass) 5 that lifts or lowers when the door 2 is closed to seal outside and inside of the vehicle.

The weather strip 20 includes: an installation base member 21 fit between an outer-cabin side holding part 10a and an inner-cabin side holding part 10b formed on the retainer 10; a hollow part 22 disposed between an inner-cabin side end 21b and a center of the installation base member 21; a hollow outer seal 23 integrally molded with an outer-cabin side of the installation base member 21, which makes elastic contact with an upper edge and an outer-cabin side surface of the door glass 5 that lifts or lowers when the door 2 is closed; and a lip-like inner seal 24 integrally molded with an outer-cabin side of the hollow part 22, which makes elastic contact with an inner-cabin side surface of the door glass 5 when the door 2 is closed. The hollow part 22 has a lip 25 on an inner-cabin side thereof which abuts interior material (not shown) including garnish. The hollow part 22 is a watercourse for draining water guided therein outside a vehicle on a front side of the vehicle.

In this connection, the Japanese examined Utility Model Publication No. H03-15401 discloses a structure that the outer seal and the inner seal of the weather strip installed on the retainer makes elastic contact with the outer-cabin side surface and the inner-cabin side surface of the door glass that lifts or lowers.

According to the ordinary weather strip 20 of FIG. 6, as the door glass 5 is guided upward as shown in FIG. 7, the inner seal 24 which makes elastic contact with the inner-cabin side of the door glass 5 is pulled toward the installation base member 21 side. On the other hand, as the door glass 5 is guided downward in a direction of an arrow in FIG. 7, that is as the door glass 5 is lowered, the inner seal 24 is dragged by the door glass 5, thereby generating tensile force lowering a central pillar 22A which connects with the inner seal 24. The tensile force is transmitted in a direction of lowering (downward in FIG. 7) an intermediate part 21c of the installation base member 21 between the hollow part 22 and the outer seal 23 via the central pillar 22A forming the hollow part 22. As a result, there has remained a problem that holding force of the weather strip 20 relative to the retainer 10 is decreased. In a worse case, an outer-cabin side end 21a or the inner-cabin side end 21b of the installation base member 21 may come off respectively from the outer-cabin side holding part 10a or the inner-cabin side holding part 10b formed on the retainer 10. Especially, in case heads of bolts or clips (not shown) as a fastener for fixing the retainer 10 on the soft top 1 or the like are provided between the installation base member 21 and the retainer 10, since the installation base member 21 is swelled and curved toward an opposite side to the retainer 10 side (downward in FIG. 7), it becomes further possible that the installation base member 21 comes off from the retainer 10.

Examples of measures to the problem include altering shapes of the outer-cabin side holding part 10a and the inner-cabin side holding part 10b and providing additional holding parts for increasing holding force of the retainer 10 relative to the weather strip 20. But, as fitting force increases, it becomes harder to smoothly insert the weather strip 20 into the retainer 10.

Another example is moving a connecting position of the central pillar 22A relative to the installation base member 21 to a position on an inner-cabin side end 21b side of the installation base member 21 for hampering force lowering the intermediate part 21c. But the structure may cause another problem that size of the hollow part 22 reduces and the hollow part 22 does not sufficiently maintain function thereof as the watercourse for draining water.

While the Japanese examined Utility Model Publication No. H03-15401 discloses techniques of increasing fitting force and improving insertion property of the weather strip into the installation base member, the Japanese examined Utility Model Publication No. H03-45401 does not disclose the hollow part which functions as the watercourse for draining water as shown in FIG. 6. Accordingly, the Japanese examined Utility Model Publication No. H03-45401 imposes less limitation on the shape of the weather strip.

Therefore, an object of the present invention is to provide the assembly structure of weather strips capable of securing stable holding force without difficulty in insertion while maintaining the watercourse for draining water.

SUMMARY

In order to achieve the above-mentioned object, according to one aspect of the invention, an assembly structure of a weather strip (40) is provided, said weather strip (40) including: an installation base member (41) fit in a frame body (30) installed on a door (2) opening edge of a retractable roof vehicle or a hard top vehicle, the frame body (30) including a part having a substantially U-shape in cross section; a hollow part (42) encircled by an inner-cabin side pillar part (42B) and a center pillar part (42A) vertically provided from an inner-cabin side end (41b) and a center part of said installation base member (41) respectively and a connecting part (42C) connecting ends of both pillar parts (42B, 42A); an outer seal (43) integrally molded with an outer-cabin side of said installation base member (41), said outer seal (43) making elastic contact with an outer cabin side surface of a door glass (5) lifting or lowering when the door (2) is closed; and an inner seal (44) integrally molded with an outer-cabin side of said center pillar part (42A), said inner seal (44) making elastic contact with an inner-cabin side surface of said door glass (5) when the door (2) is closed, wherein:

an outer-cabin side holding part (30a) and an inner-cabin side holding part (30b) are formed on an outer-cabin side and an inner-cabin side of said frame body (30) respectively, said outer-cabin side holding part (30a) and said inner-cabin side holding part (30b) protruding toward an inner side from positions spaced out from a base surface (31) of said frame body (30), and said inner-cabin side holding part (30b) side being on a position further spaced out from the base surface (31) of said frame body (30) than said outer-cabin side holding part (30a) side;

an anchoring part (41d) is protrudingly provided on an inner-cabin side of said inner-cabin side pillar part (42B), said anchoring part (41d) being spaced out from a base root of said inner-cabin side pillar part (42B) on said installation base member (41); and a total (80) of a distance (50) between said anchoring part (41d) and the base root of said inner-cabin side pillar part (42B) on said installation base member (41) and a distance (60) between the base root and an outer-cabin side end (41a) of said installation base member (41) (80=50+60) is longer than a straight-linear distance (70) between said outer-cabin side holding part (30a) and the inner-cabin side holding part (30b), and the outer-cabin side end (41a) and said anchoring part (41d) of said installation base member (41) are anchored with said outer-cabin side holding part (30a) and the inner-cabin side holding part (30b) respectively.

In addition, according to an aspect of the present invention, said inner seal (44) includes a first wall (44A) and a second wall (44B) respectively extending from an end of said center pillar part (42A) and a part on a base root side of said center pillar part (42A) toward an outer-cabin side, said first wall (44A) and said second wall (44B) being connected with each other on one ends thereof in a curved state.

In addition, according to an aspect of the present invention, said outer seal (43) is hollow, base roots of the said outer seal (43) being connected with the outer-cabin side end (41a) of said installation base member (41) and a part (41e) on an outer-cabin side of a connecting position of said center pillar part (42A) with said installation base member (41) respectively, and said outer seal (43) also making elastic contact with an upper edge of said door glass (5).

In addition, according to an aspect of the present invention, a range between the inner-cabin side end (41b) of said installation base member (41) and the part (41e) on an outer-cabin side of the connecting position of said center pillar part (42A) with said installation base member (41) is swelled and curved in an opposite direction to said frame body (30) side.

In addition, according to an aspect of the present invention, said second wall (44B) has a substantially V-shape in cross section, a center part of said second wall (44B) being bent to approach said first wall (44A) side.

In addition, according to an aspect of the present invention, thickness (90) of a center part of said first wall (44A) is thicker than at least one other part of said first wall (44A). Symbols in parentheses show constituents or items corresponding to the drawings.

According to the assembly structure of the weather strip of the present invention, the outer-cabin side holding part and the inner-cabin side holding part are formed on the positions spaced out from the base surface of the frame body. The inner-cabin side holding part side is on the position further spaced out from the base surface than the outer-cabin side holding part side, that is the two holding parts are formed on uneven positions. Also, the total of the distance between the anchoring part protrudingly provided on the inner-cabin side of the inner-cabin side pillar part and the base root of the inner-cabin side pillar part and the distance between the base root and the outer-cabin side end of the installation base member is longer than the straight-linear distance between the outer-cabin side holding part and the inner-cabin side holding part, and the outer-cabin side end and the anchoring part on the inner-cabin side of the installation base member are anchored with the outer-cabin side holding part and the inner-cabin side holding part respectively. Accordingly, even in case force acts in a direction that the installation base member comes off from the frame body as the inner seal makes elastic contact with the inner-cabin side of the door glass, the installation base member does not come off easily, thereby maintaining sufficient holding force.

In addition, the structure is simple, which necessitates only anchoring the outer-cabin side end and the anchoring part on the inner-cabin side of the installation base member with two parts, the outer-cabin side holding part and the inner-cabin side holding part, respectively. Accordingly, insertion of the weather strip for assembly on the frame body is smooth and simple.

In this case, moving the connecting position of the center pillar part with the installation base member as in the prior art becomes unnecessary. Accordingly, size of the hollow part does not reduce, thereby sufficiently maintaining function as the watercourse for draining water.

In addition, the inner seal includes the first wall and the second wall respectively extending from the end of the center pillar part and the part on the base root side of the center pillar part toward the outer-cabin side, the first wall and the second wall being connected with each other on one ends thereof. Such a structure generates a hollow between the first wall and the second wall. Accordingly, in the same manner as one of the functions of the hollow part, the inner seal can function as a watercourse for draining water guided therein outside the vehicle on a front side of the vehicle.

Also, the inner seal makes elastic contact with the door glass on a part thereof on which the first wall and the second wall are connected with each other in the curved state, not a lip-like part. Such a structure prevents reversal or turn.

In addition, the outer seal is hollow, which is more excellent in sealing property relative to the door glass than lip-like outer seals. But the hollow outer seal can easily generate force which acts on the installation base member from the base root thereof on the inner-cabin side when making elastic contact with the door glass. Accordingly, the present invention is more effective in the weather strips of this shape.

In addition, the range between the inner-cabin side end of the installation base member and the part on the outer-cabin side of the connecting position of the center pillar part with the installation base member is swelled and curved in the opposite direction to the frame body side. Such a structure enables installation of bolts or clips between the installation base member and the frame body for installing the frame body. But a shape swelled and curved can easily generate force which acts on the installation base member from the base root on the inner-cabin side of the outer seal when making elastic contact with the door glass and the outer seal can easily follow the lowering door glass when opening the door glass. Accordingly, the present invention is more effective in the weather strips of this shape.

In addition, the second wall has the substantially V-shape in cross section, the center part of the second wall being bent to approach the first wall side. Accordingly, a side surface of the first wall touches the surface of the door glass, not the top end of the first wall, thereby decreasing resistance when lifting or lowering the door glass. For example, when the inner seal makes elastic contact with the door glass while lowering the door glass, force pulling the installation base member via the second wall in a direction away from the frame body is controlled. Also, an elastic contact position on the inner seal relative to the door glass is stabilized.

In addition, the thickness of the center part of the first wall is thicker than at least one other part of the first wall. Accordingly, an abutting part on the first wall with the door glass is stabilized when making elastic contact with the door glass, and when lowering the door glass, reversal of the inner seal is further prevented.

DESCRIPTION OF PREFERRED EMBODIMENT

Figure 1:
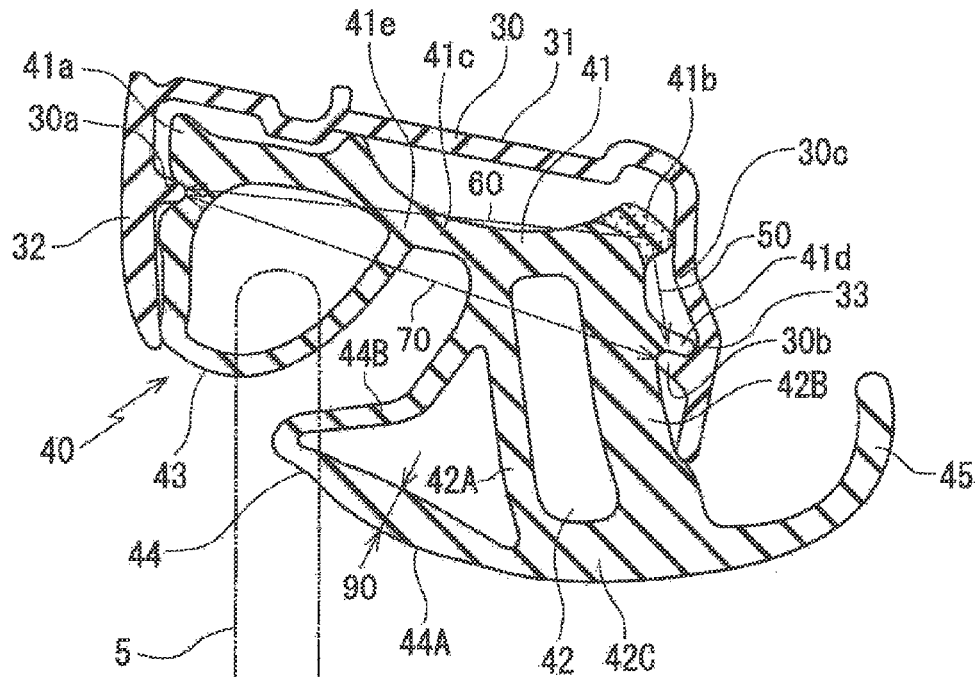
FIG. 1 is an I-I line enlarged cross section of FIG. 5, showing an assembly structure of a weather strip according to an embodiment of the present invention before a door glass is guided therein.
Figure 2:
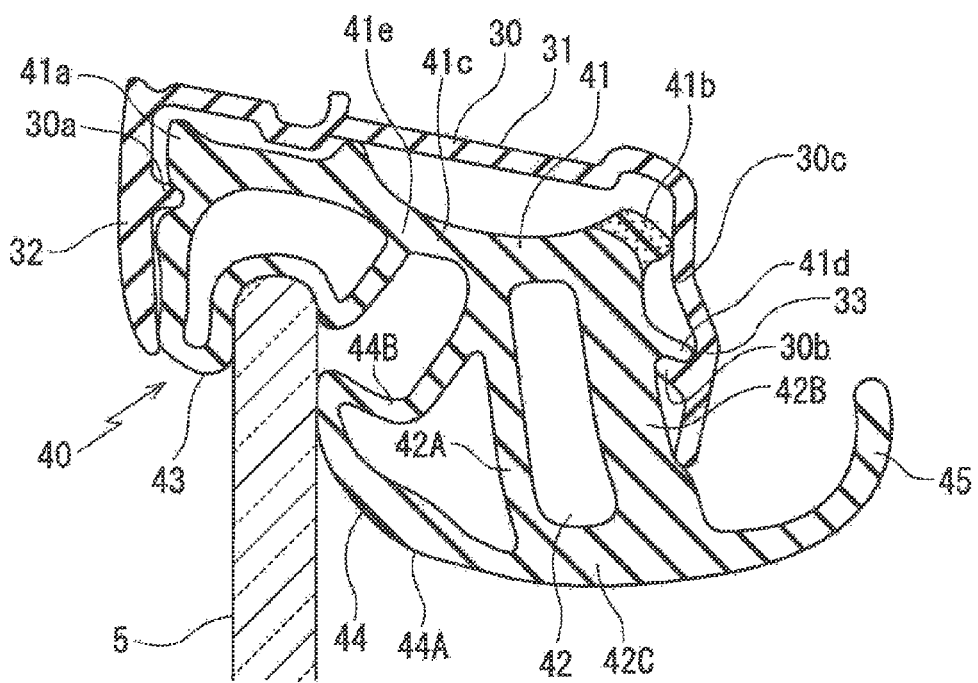
FIG. 2 is an I-I line enlarged cross section of FIG. 5, showing the assembly structure of the weather strip according to the embodiment of the present invention after the door glass is guided therein.
Figure 5:
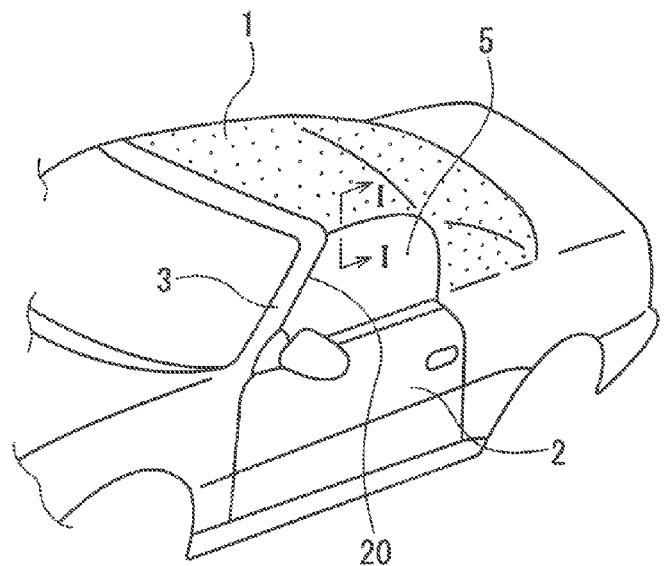
FIG. 5 is a perspective view of an automobile.
Figure 6:
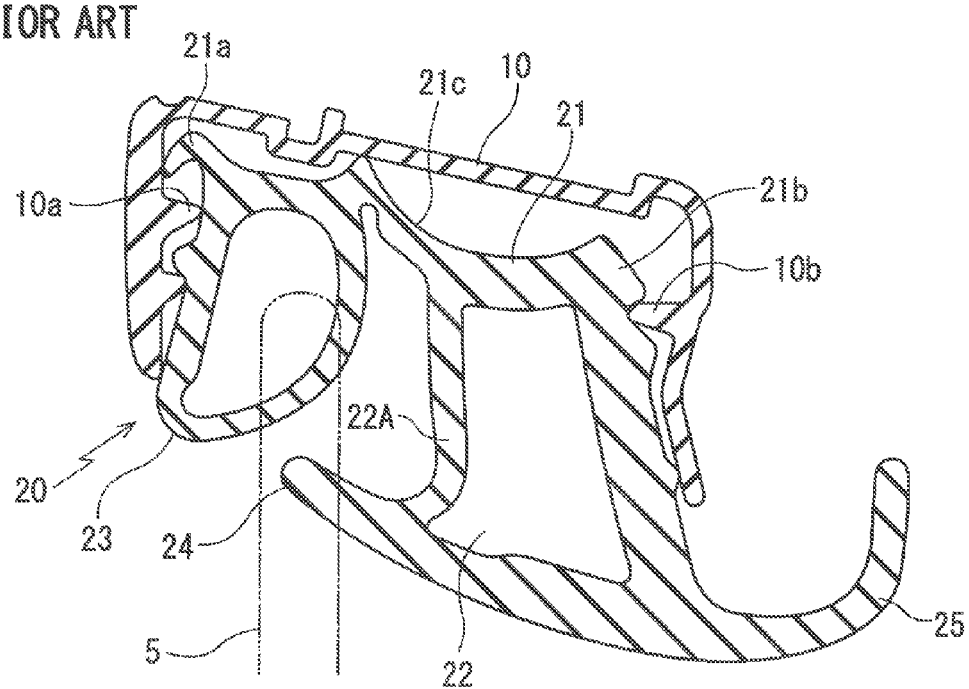
FIG. 6 is an I-I line enlarged cross section of FIG. 5, showing an assembly structure of a weather strip according to a prior art before a door glass is guided therein.
Figure 7:
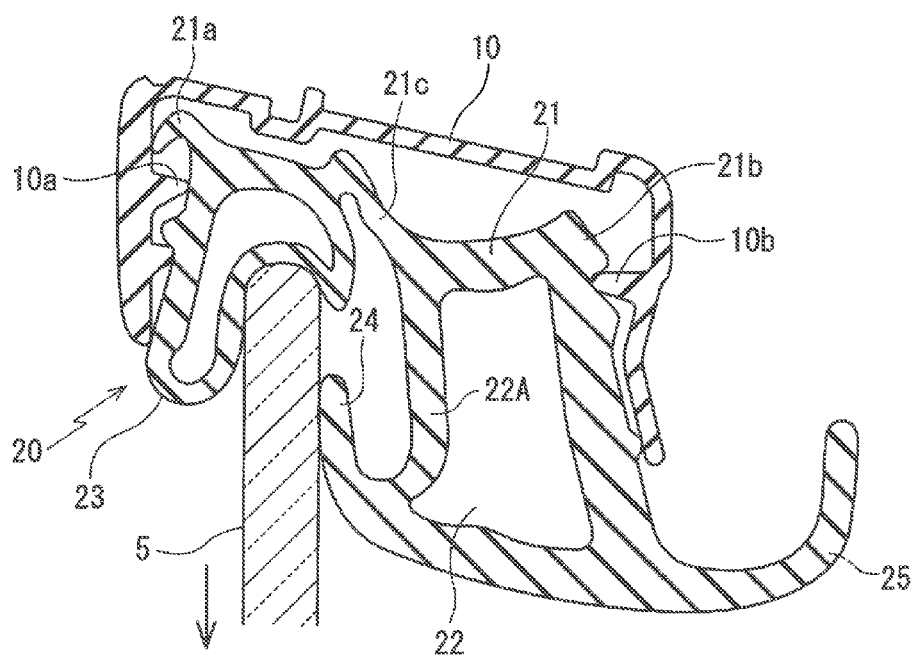
FIG. 7 is an I-I line enlarged cross section of FIG. 5, showing the assembly structure of the weather strip according to the prior art after the door glass is guided therein.

Referring to FIG. 1, FIG. 2 and FIG. 5, an assembly structure of a weather strip according to an embodiment of the present invention will be described.

FIG. 1 shows an assembly structure of a weather strip according to an embodiment of the present invention before a door glass 5 is guided therein while FIG. 2 shows a state after the door glass 5 is guided therein. FIG. 1 and FIG. 2 are I-I line enlarged cross sections of FIG. 5 but a soft top 1 is omitted in the Figs. When constituents or items correspond to those in prior arts, the same symbols are used.

According to the assembly structure of the weather strip according to the embodiment of the present invention, in a retractable roof vehicle shown in FIG. 5, a weather strip 40 which makes elastic contact with a door glass (side glass) 5 is assembled on a retainer 30. A structure of the retractable roof vehicle is the same as that of the prior art.

The retainer 30 is installed on a door 2 opening edge and functions as a frame body. The retainer 30 includes a part having a substantially U-shape in cross section including: a base surface 31; and an outer-cabin side surface 32 and an inner-cabin side surface 33, which extend from both ends of the base surface 31 respectively. In the present embodiment, the retainer 30 as a whole has the substantially U-shape in cross section.

An outer-cabin side holding part 30a and an inner-cabin side holding part 30b which protrude toward an inner side are formed on an outer-cabin side and an inner-cabin side of the retainer 30 respectively. The outer-cabin side holding part 30a protrudes from a position which is on an inner-cabin side of the outer-cabin side surface 32 and spaced out from a base surface 31. The inner-cabin side holding part 30b protrudes from a position which is on an outer-cabin side of the inner-cabin side surface 33 and spaced out from the base surface 31. A distance between the outer-cabin side holding part 30a and the base surface 31 is at least a size which allows an outer-cabin side end 41a of an installation base member 41 of the weather strip 40 to come in. The inner-cabin side holding part 30b side is on a position further spaced out from the base surface 31 than the outer-cabin side holding part 30a side.

In addition, on the inner-cabin side surface 33, a bent part 30c bent to protrude toward an outer-cabin side is formed on a connecting position between a position of the inner-cabin side holding part 30b and the base surface 31.

The weather strip 40 mainly includes: an installation base member 41; a hollow part; an outer seal 43; and an inner seal 44.

The installation base member 41 is fit in the retainer 30 in a manner to face the base surface 31 of the retainer 30. An inner-cabin side end 41b of the installation base member 41 is made of sponge for reducing generation of noise caused by vibration of the door glass 5.

A hollow part 42 is encircled by an inner-cabin side pillar part 42B and a center pillar part 42A vertically provided from the inner-cabin side end 41b and a center part of the installation base member 41 respectively and a connecting part 42C connecting ends of both pillar parts 42B, 42A. This encircled space, for example, can function as a watercourse for draining water guided therein outside a vehicle on a front side of the vehicle.

Thickness of the inner-cabin side pillar part 42B is thicker (about twice) than the center pillar part 42A. An anchoring part 41d is protrudingly provided on an inner-cabin side of the inner-cabin side pillar part 42B and is spaced out from a base root of the inner-cabin side pillar part 42B connected with the installation base member 41.

The anchoring part 41d is provided on a position which meets the following condition: a total 80 of a distance 50 between the anchoring part 41d and the base root of the inner-cabin side pillar part 42B on the installation base member 41 and a distance 60 between the base root and the outer-cabin side end 41a of the installation base member 41 (80=50+60) is longer than a straight-linear distance 70 between the outer-cabin side holding part 30a and the inner-cabin side holding part 30b of the retainer 30. The outer-cabin side end 41a and the anchoring part 41d of the installation base member 41 are anchored with the outer-cabin side holding part 30a and the inner-cabin side holding part 30b respectively for assembling the weather strip 40 on the retainer 30.

A lip 45 which extends toward an inner-cabin side and abuts interior material including garnish (not shown) is provided on a connecting position between the inner-cabin side pillar part 42B and the connecting part 42C.

The outer seal 43 is integrally molded with an outer-cabin side of the installation base member 41 and makes elastic contact with an outer-cabin side surface and an upper edge of the door glass 5 lifting or lowering when the door 2 is closed.

The outer seal 43 is hollow and base roots of the outer seal 43 are connected with the outer-cabin side end 41a of the installation base member 41 and a part 41e on an outer-cabin side of a connecting position of the center pillar part 42A with the installation base member 41 respectively. The outer seal 43 is swelled and curved relative to a direction in which the door glass 5 lifts (direction opposite to the retainer 30 side), for making elastic contact with the upper edge of the door glass 5 without fail when the door 2 is closed. In other words, as shown in FIG. 2, when the door glass 5 lifts while the door 2 is closed, the outer seal 43 makes elastic contact with the upper edge over the outer-cabin side surface of the door glass 5 in a manner to wrap the door glass 5.

The inner seal 44 is integrally molded with an outer-cabin side of the center pillar part 42A and makes elastic contact with an inner-cabin side surface of the door glass 5 lifting or lowering when the door 2 is closed.

The inner seal 44 is formed by connecting ends of the center pillar part 42A, that is: an end of a first wall 44A inclining and extending in a direction approaching the installation base member 41 on the outer-cabin side from a connecting position between the center pillar part 42A and the connecting part 42C; and an end of a second wall 44B inclining and extending in a direction away from the installation base member 41 on the outer-cabin side from a base root side of the center pillar part 42A, from the base root of the center pillar part 42A on the installation base member 41 in the present embodiment. A resultant connecting part makes elastic contact with the door glass 5. The connecting part of the first wall 44A and the second wall 44B, which makes elastic contact with the door glass 5 is in a curved state and a lip-like protrusion is not formed as in the prior art.

Accordingly, the part encircled by the first wall 44A and the second wall 44B is hollow and, in the same manner as the hollow part 42, the part can function as a watercourse for draining water guided therein outside the vehicle on the front side of the vehicle.

Thickness 90 of a center part of the first wall 44A is thicker than at least one other part of the first wall 44A. Accordingly, when a connected end of the first wall 44A and the second wall 44B as a top end of the inner seal 44 makes elastic contact with the door glass 5, an abutting part of the first wall 44A with the door glass 5 is stabilized. When the door glass 5 is lowered, the top end of the inner seal 44 is prevented from reversal to turn.

In addition, the second wall 44B has the substantially V-shape in cross section, and the center part of the second wall 44B being bent to approach the first wall side 44A. Accordingly, when the top end of the inner seal 44 makes elastic contact with the door glass 5, a side surface of the first wall 44A touches the surface of the door glass 5, not the top end of the first wall 44A, thereby decreasing resistance when lifting or lowering the door glass 5. Especially, while lowering the door glass 5, force pulling an intermediate part 41c of the installation base member 41 via the second wall 44B in a direction away from the retainer 30 (downward direction in FIG. 2) is controlled.

In addition, a range between the inner-cabin side end 41b of the installation base member 41 and at least a part 41e on an outer-cabin side of the connecting position of the center pillar part 42A with the installation base member 41 is swelled and curved in an arch-like shape toward an opposite side to the retainer 30 side. The intermediate part 41c is in the range thus swelled and curved. Bolts or clips (not shown) for fixing the retainer 30 are provided between the retainer 30 and the installation base member 41 thus swelled and curved, in a longitudinal direction in which the retainer 30 and the weather strip 40 extend at regular intervals.

According to the above-structured weather strip 40 of the present embodiment, the outer-cabin side holding part 30a and the inner-cabin side holding part 30b are formed on the retainer 30. The outer-cabin side holding part 30a and the inner-cabin side holding part 30b are formed on positions spaced out from the base surface 31 of the retainer 30, and the inner-cabin side holding part 30b side is on the position further spaced out from the base surface 31 than the outer-cabin side holding part 30a side, that is two holding parts 30a, 30b are formed on uneven positions. Also, a total 80 of a distance 50 between the anchoring part 41d protrudingly provided on an inner-cabin side of the inner-cabin side pillar part 42B and the base root of the inner-cabin side pillar part 42B and a distance 60 between the base root and the outer-cabin side end 41a of the installation base member 41 (80=50+60) is longer than the straight-linear distance 70 between the outer-cabin side holding part 30a and the inner-cabin side holding part 30b, and the outer-cabin side end 41a and the anchoring part 41d of the installation base member 41 are anchored with the outer-cabin side holding part 30a and the inner-cabin side holding part 30b respectively. Accordingly, even in case the inner seal 44 makes elastic contact with the inner-cabin side of the door glass 5, the inner seal 44 is dragged by the lowering door glass 5 and force acts on the center pillar part 42A which connects with the inner seal 44 in a lowering direction, that is a direction that the installation base member 41 comes off from the retainer 30, the installation base member 41 does not easily come off and sufficient holding force is maintained. In case the center pillar part 42A is provided around a center of width in an automobile width direction of the installation base member 41, the installation base member 41 may easily come off. The embodiment prevents the situation, thereby widening latitude in design of the weather strip 40.

In addition, the structure is simple, which necessitates only anchoring the outer-cabin side end 41a and the anchoring part 41d of the installation base member 41 with two parts, the outer-cabin side holding part 30a and the inner-cabin side holding part 30b, respectively. Accordingly, insertion of the weather strip 40 for assembly on the frame body is smooth and simple.

As to the function as the watercourse for draining water, moving the connecting position of the center pillar part 42A with the installation base member 41 as in the prior art becomes unnecessary. Accordingly, size of the hollow part 42 does not reduce, thereby sufficiently maintaining function as the watercourse for draining water.

Figure 3:
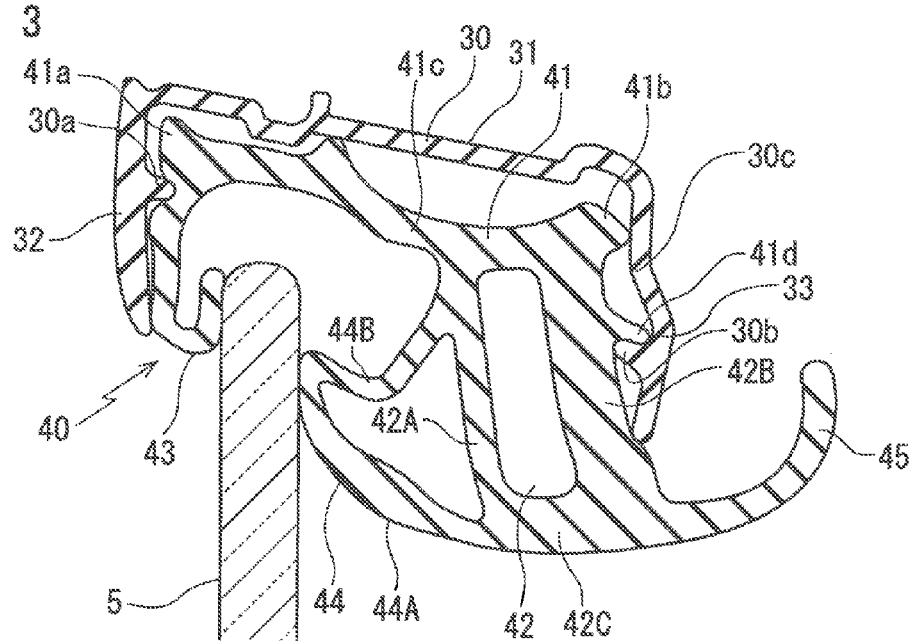
FIG. 3 is an I-I line enlarged cross section of FIG. 5, showing another assembly structure of a weather strip according to the embodiment of the present invention after a door glass is guided therein.

While the outer seal 43 of the embodiment of the present invention is hollow and makes elastic contact with the upper edge and the outer-cabin side surface of the door glass 5, the outer seal 43 may also be a lip-like outer seal which makes elastic contact with the outer-cabin side surface of the door glass 5 as shown in FIG. 3.

While the inner-cabin side end 41b of the installation base member 41 of the embodiment of the present invention is made of sponge for reducing generation of noise caused by vibration of the door glass 5, the installation base member 41 as a whole may be integrally molded by solid rubber.

Figure 4:
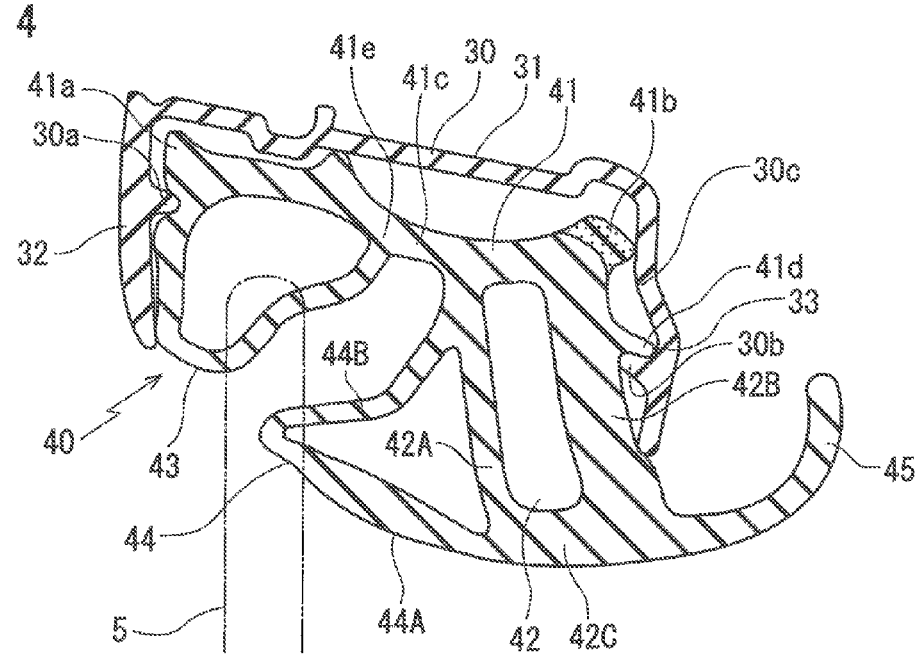
FIG. 4 is an I-I line enlarged cross section of FIG. 5, showing still another assembly structure of a weather strip according to the embodiment of the present invention before a door glass is guided therein.

While the outer seal 43 of the embodiment of the present invention is swelled and curved relative to the direction in which the door glass 5 lifts (direction opposite to the retainer 30 side), the outer seal 43 may also have a substantially V-shape in cross section (opposite to the second wall 44B having a substantially V-shape in cross section in a bent direction), of which center part is bent to approach a connecting part side of the base surface 31 and the outer-cabin side surface 32 of the retainer 30 (outer-cabin side corner side of the retainer 30) as shown in FIG. 4. As compared with the outer seal 43 swelled and curved (FIG. 1), when the outer seal 43 having the substantially V-shape in cross section makes elastic contact with the door glass 5, force which acts on the intermediate part 41c of the installation base member 41 via the base root side on the inner-cabin side of the outer seal 43 and repulsion are controlled.

While the embodiment of the present invention discloses the assembly structure of the weather strip 40 on the retainer 30 installed along the door opening edge of the retractable roof vehicle, the retainer 30 may also be installed along a door opening edge of a hard top vehicle. Also, the retainer 30 is used as an example of the frame body on which the weather strip 40 is assembled, but the present invention is not limited to the retainer 30 and a sash and so on may also be used. In addition, any frame body including a part having a U-shape in cross section for fitting the installation base member 41 of the weather strip 40 is usable.

I claim:

1. An assembly structure of a weather strip comprising: an installation base member fit in a frame body installed on a door opening edge of a retractable roof vehicle or a hard top vehicle, the frame body including a part having a substantially U-shape in cross section; a hollow part encircled by an inner-cabin side pillar part and a center pillar part vertically provided from an inner-cabin side end and a center part of said installation base member respectively and a connecting part connecting ends of both pillar parts; an outer seal integrally molded with an outer-cabin side of said installation base member, said outer seal making elastic contact with an outer-cabin side surface of a door glass lifting or lowering when the door is closed; and an inner seal integrally molded with an outer-cabin side of said center pillar part, said inner seal making elastic contact with an inner-cabin side surface of said door glass when the door is closed, wherein:
   - an outer-cabin side holding part and an inner-cabin side holding part are formed on an outer-cabin side and an inner-cabin side of said frame body respectively, said outer-cabin side holding part and said inner-cabin side holding part protruding toward an inner side from positions spaced out from a base surface of said frame body, and said inner-cabin side holding part being spaced out further from the base surface of said frame body than said outer-cabin side holding part;
   - an anchoring part is protrudingly provided on an inner-cabin side of said inner-cabin side pillar part, said anchoring part being spaced out from a base root of said inner-cabin side pillar part on said installation base member; and
   - a total of a distance between a base of said anchoring part and the base root of said inner-cabin side pillar part on said installation base member and a distance between the base root and an outer-cabin side end of said installation base member is longer than a straight-linear distance between an end of said outer-cabin side holding part and a base of the inner-cabin side holding part, and the outer-cabin side end and said anchoring part of said installation base member are anchored with said outer-cabin side holding part and the inner-cabin side holding part respectively.

2. The assembly structure of the weather strip as claimed in claim 1, wherein: said inner seal comprises a first wall and a second wall respectively extending from an end of said center pillar part and a part on a base root side of said center pillar part toward said outer-cabin side, said first wall and said second wall being connected with each other on one ends thereof in a curved state.

3. The assembly structure of the weather strip as claimed in claim 2, wherein: said second wall has a substantially V-shape in cross section, a center part of said second wall being bent to approach said first wall side.

4. The assembly structure of the weather strip as claimed in claim 2, wherein: said outer seal is hollow, base roots of the said outer seal being connected with the outer-cabin side end of said installation base member and a part on said outer-cabin side of a connecting position of said center pillar part with said installation base member respectively, and said outer seal also making elastic contact with an upper edge of said door glass.

5. The assembly structure of the weather strip as claimed in claim 4, wherein: a range between the inner-cabin side end of said installation base member and the part on said outer-cabin side of the connecting position of said center pillar part with said installation base member is swelled and curved in an opposite direction to said frame body side.

6. The assembly structure of the weather strip as claimed in claim 5, wherein: said second wall has a substantially V-shape in cross section, a center part of said second wall being bent to approach said first wall side.

7. The assembly structure of the weather strip as claimed in claim 4, wherein: said second wall has a substantially V-shape in cross section, a center part of said second wall being bent to approach said first wall side.

8. The assembly structure of the weather strip as claimed in claim 2, wherein: a range between the inner-cabin side end of said installation base member and the part on said outer-cabin side of the connecting position of said center pillar part with said installation base member is swelled and curved in an opposite direction to said frame body side.

9. The assembly structure of the weather strip as claimed in claim 8, wherein: said second wall has a substantially V-shape in cross section, a center part of said second wall being bent to approach said first wall side.

10. The assembly structure of the weather strip as claimed in claim 1, wherein: said outer seal is hollow, base roots of said outer seal being connected with the outer-cabin side end of said installation base member and a part on said outer-cabin side of a connecting position of said center pillar part with said installation base member respectively, and said outer seal also making elastic contact with an upper edge of said door glass.

11. The assembly structure of the weather strip as claimed in claim 10, wherein: a range between the inner-cabin side end of said installation base member and the part on said outer-cabin side of the connecting position of said center pillar part with said installation base member is swelled and curved in an opposite direction to said frame body side.

12. The assembly structure of the weather strip as claimed in claim 11, wherein: said second wall has a substantially V-shape in cross section, a center part of said second wall being bent to approach said first wall side.

13. The assembly structure of the weather strip as claimed in claim 10, wherein: said second wall has a substantially V-shape in cross section, a center part of said second wall being bent to approach said first wall side.

14. The assembly structure of the weather strip as claimed in claim 1, wherein: a range between the inner-cabin side end of said installation base member and the part on said outer-cabin side of the connecting position of said center pillar part with said installation base member is swelled and curved in an opposite direction to said frame body side.

15. The assembly structure of the weather strip as claimed in claim 14, wherein: said second wall has a substantially V-shape in cross section, a center part of said second wall being bent to approach said first wall side.

* * * * *